United States Patent
Brit-Artzi et al.

(10) Patent No.: US 11,392,870 B2
(45) Date of Patent: Jul. 19, 2022

(54) MAINTENANCE COST ESTIMATION

(71) Applicant: EMC IP Holding Company LLC, Hopkinton, MA (US)

(72) Inventors: Hagit Brit-Artzi, Framingham, MA (US); Malak Alshawabkeh, Franklin, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 16/750,678

(22) Filed: Jan. 23, 2020

(65) Prior Publication Data

US 2021/0233003 A1 Jul. 29, 2021

(51) Int. Cl.
| | |
|---|---|
| *G06Q 10/06* | (2012.01) |
| *G06N 3/08* | (2006.01) |
| *G06Q 10/08* | (2012.01) |
| *G06Q 10/00* | (2012.01) |

(52) U.S. Cl.
CPC ......... *G06Q 10/06315* (2013.01); *G06N 3/08* (2013.01); *G06Q 10/0875* (2013.01); *G06Q 10/20* (2013.01)

(58) Field of Classification Search
CPC ....... G06Q 10/06313; G06Q 10/06315; G06N 20/00; G06N 3/02
See application file for complete search history.

(56) References Cited

U.S. PATENT DOCUMENTS

| | | | | |
|---|---|---|---|---|
| 2008/0288321 A1* | 11/2008 | Dillon | .............. | G06Q 10/06311 705/7.13 |
| 2019/0025810 A1* | 1/2019 | Chapin | .................. | G06Q 10/20 |
| 2019/0339687 A1* | 11/2019 | Cella | ..................... | G06N 3/006 |

FOREIGN PATENT DOCUMENTS

| | | | | |
|---|---|---|---|---|
| CN | 108549936 A | * | 9/2018 | |
| WO | WO-2017081659 A1 | * | 5/2017 | ............... G01D 3/08 |

OTHER PUBLICATIONS

Pang, Kevin. Self-organizing Maps. Neural Networks—Fall 2003. from https://www.cs.hmc.edu/~kpang/nn/som.ntml (Year: 2003).*

(Continued)

*Primary Examiner* — Johnna R Loftis
(74) *Attorney, Agent, or Firm* — Muirhead and Saturnelli, LLC

(57) ABSTRACT

Estimating maintenance for a storage system includes accessing a model that outputs time and materials estimates based on input configuration data, providing configuration data of the storage system to the model, and obtaining an estimate of maintenance time and materials based on the configuration data provided to the model. The model may be provided by a neural network, which may be a self-organized map. Weights of neurons of the self-organized map may be initialized randomly. The model may be initially configured using training data that may include an I/O load of the storage system, memory size of the storage system, a drive count of the storage system, and/or size and parameter information corresponding to hardware being added for the maintenance operation. The training data may include actual time and materials for prior storage system maintenance operations used for the training data. The model may be provided on the storage system.

16 Claims, 5 Drawing Sheets

(56) References Cited

OTHER PUBLICATIONS

Bullinaria, John A. Self Organizing Maps: Fundamentals. Introduction to Neural Networks: Lecture 16 (Year: 2004).*
Horowitz, Roberto, and Alvarez, Luiz. Self-organizing Neural Networks: convergence properties. IEEE (Year: 1996).*

* cited by examiner

MAINTENANCE COST ESTIMATION

TECHNICAL FIELD

This application relates to the field of computer systems and storage systems therefor and, more particularly, to the field of estimating maintenance costs for storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units or logical devices. The logical devices may or may not correspond to any one of the actual disk drives. Allowing multiple host systems to access the single storage system allows the host systems to share data stored therein among different host processor systems.

Many customers that use storage systems, such as banks, may require that the system be operational at all times. Achieving this entails employing redundant systems, having a failover strategy, etc. and also requires a significant maintenance program to keep the hardware and software up-to-date and operating properly. Even in instances where continuous operation is not necessarily required, proper maintenance and proper operation of a storage system may still be important. Depending in the amount and frequency of maintenance, the cost of maintenance for a system could significantly exceed the initial cost of the hardware and software for the system.

Generally, a vendor provides maintenance by initially estimating the components and time needed (parts and labor) for a particular maintenance operation. The customer is charged based on the estimate. If the maintenance operation takes longer than expected and/or requires more or different components than originally estimated, then either the customer or the vendor must cover the additional, unexpected, cost. If the vendor covers the additional cost, the vendor may lose money performing the maintenance operation. The customer, on the other hand, may not want to pay any additional cost and, in some cases, may be contractually protected from maintenance cost overruns. Of course, the vendor may seek to prevent unexpected additional costs by providing higher estimates for maintenance operations, but then the vendor may lose business to competitors that provide lower estimates. Moreover, the customer may not appreciate paying an amount for maintenance based on a higher estimate for parts and labor that the customer does not receive. Thus, it is in the interest of the vendor to provide as accurate an estimate as possible. However, many storage systems are relatively complex and may be configured in a variety of different ways, thus making specific maintenance operations difficult to estimate; the cost for a particular maintenance operation on a one storage system may be very different than the cost of the same maintenance operation on a different system due to the first storage system and the second storage system having very different configurations.

Accordingly, it is desirable to provide a mechanism that facilitates accurate estimates for maintenance of storage systems.

SUMMARY OF THE INVENTION

According to the system described herein, estimating maintenance for a storage system includes accessing a model that outputs time and materials estimates based on input configuration data, providing configuration data of the storage system to the model, and obtaining an estimate of maintenance time and materials based on the configuration data provided to the model. The model may be provided by a neural network. The neural network may be a self-organized map. Weights of neurons of the self-organized map may be initialized randomly. The model may be initially configured using training data. The training data may include an I/O load of the storage system, memory size of the storage system, a drive count of the storage system, and/or size and parameter information corresponding to hardware being added for the maintenance operation. The size and parameter information corresponding to hardware being added may include physical storage unit capacity of the hardware, a CPU count of the hardware, and/or a memory size of the hardware. The training data may include actual time and materials for prior storage system maintenance operations used for the training data. The estimate of maintenance time and materials may be broken into separate phases. The model may be provided on the storage system.

According further to the system described herein, a non-transitory computer readable medium contains software that estimates maintenance for a storage system. The software includes executable code that accesses a model that outputs time and materials estimates based on input configuration data, executable code that provides configuration data of the storage system to the model, and executable code that obtains an estimate of maintenance time and materials based on the configuration data provided to the model. The model may be provided by a neural network. The neural network may be a self-organized map. Weights of neurons of the self-organized map may be initialized randomly. The model may be initially configured using training data. The training data may include an I/O load of the storage system, memory size of the storage system, a drive count of the storage system, and/or size and parameter information corresponding to hardware being added for the maintenance operation. The size and parameter information corresponding to hardware being added may include physical storage unit capacity of the hardware, a CPU count of the hardware, and/or a memory size of the hardware. The training data may include actual time and materials for prior storage system maintenance operations used for the training data. The estimate of maintenance time and materials may be broken into separate phases. The software may be provided on the storage system.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein uses a neural network to estimate time and materials for a prospective maintenance operation. The neural network may be a self-organized map that is trained using customer configurations and maintenance time and materials from prior maintenance operations.

Figure 1:
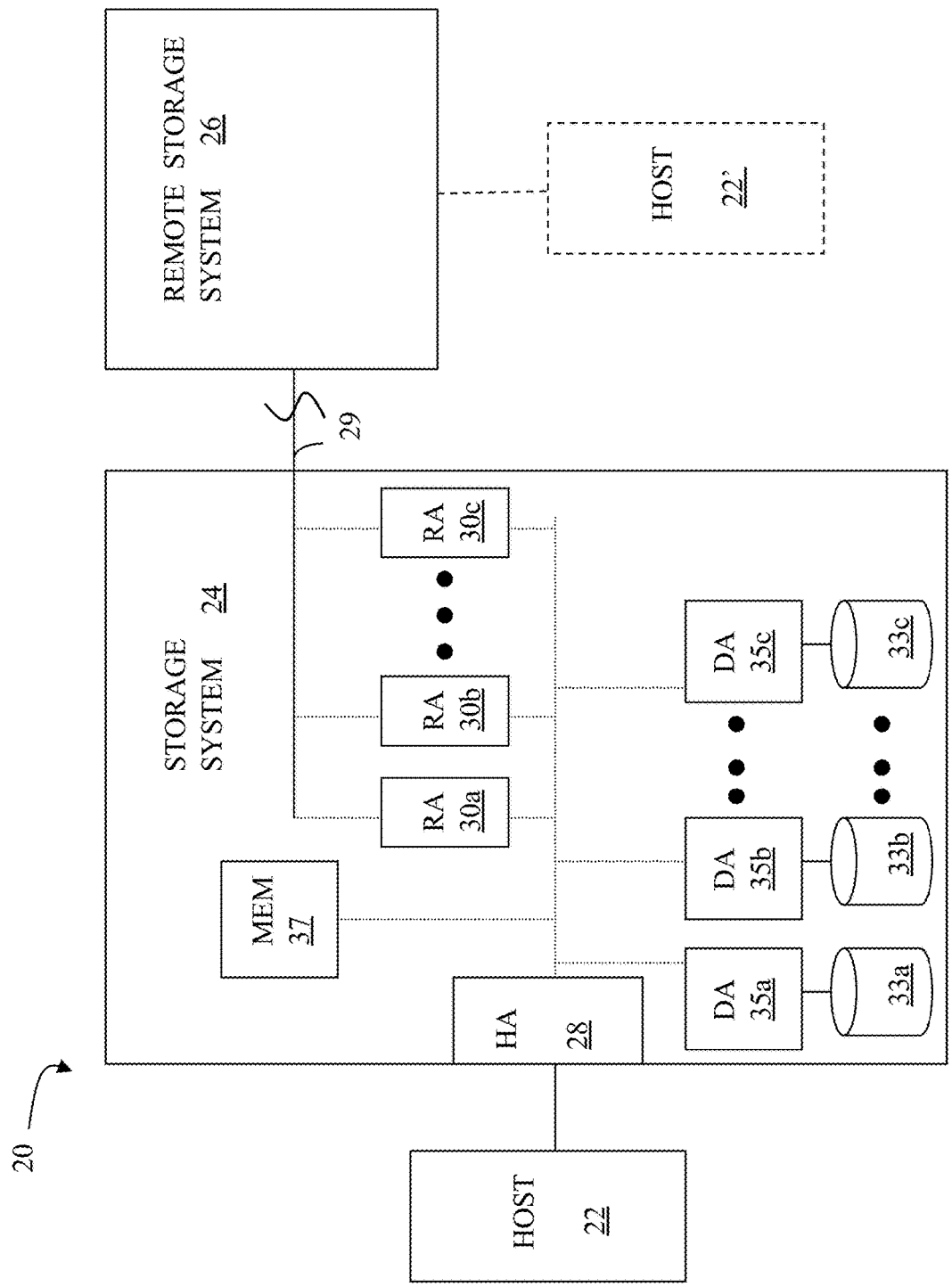
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
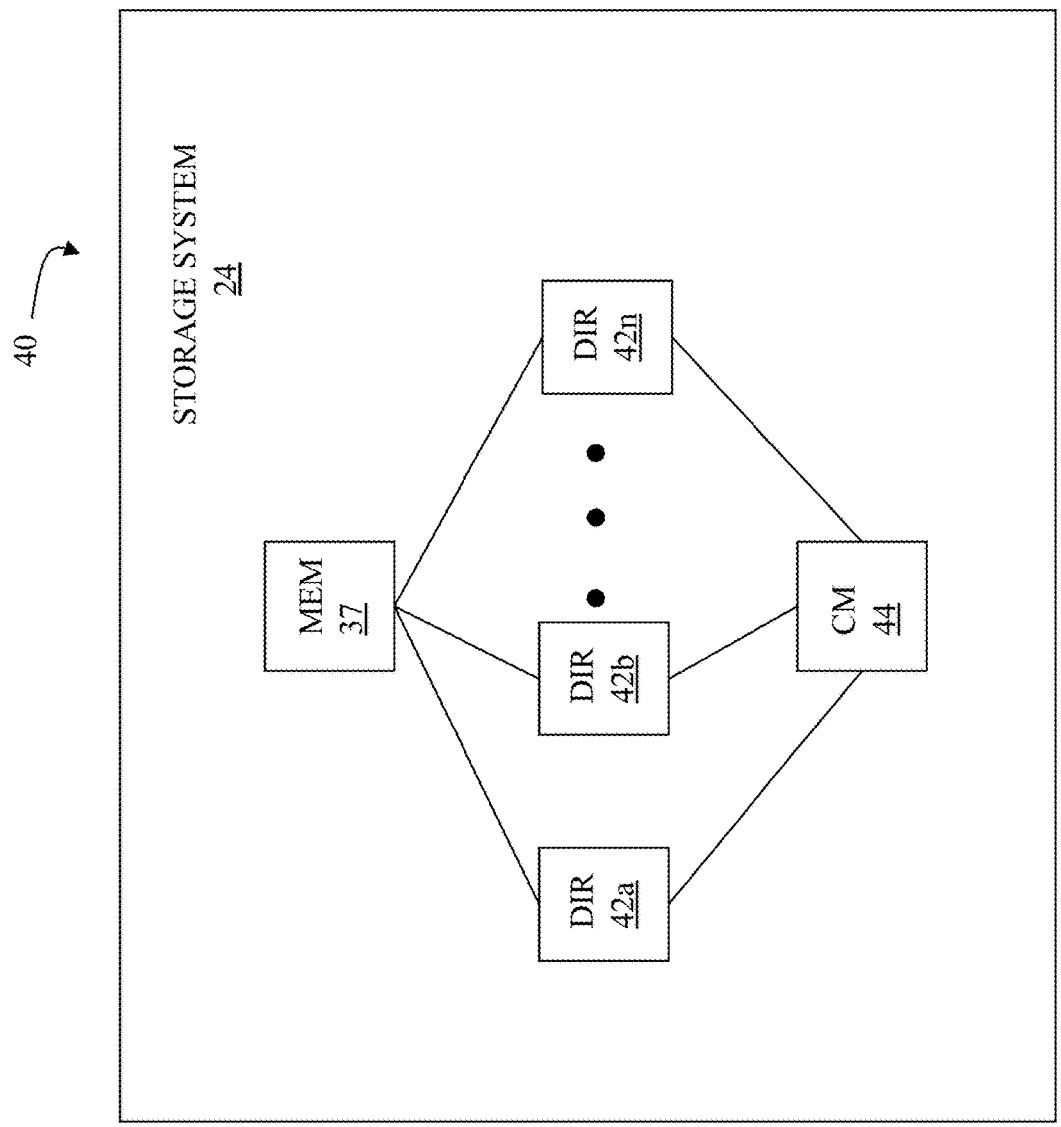
FIG. 2 is a schematic diagram illustrating an embodiment of a storage system where each of a plurality of directors are coupled to the memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIG. 1 and FIG. 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
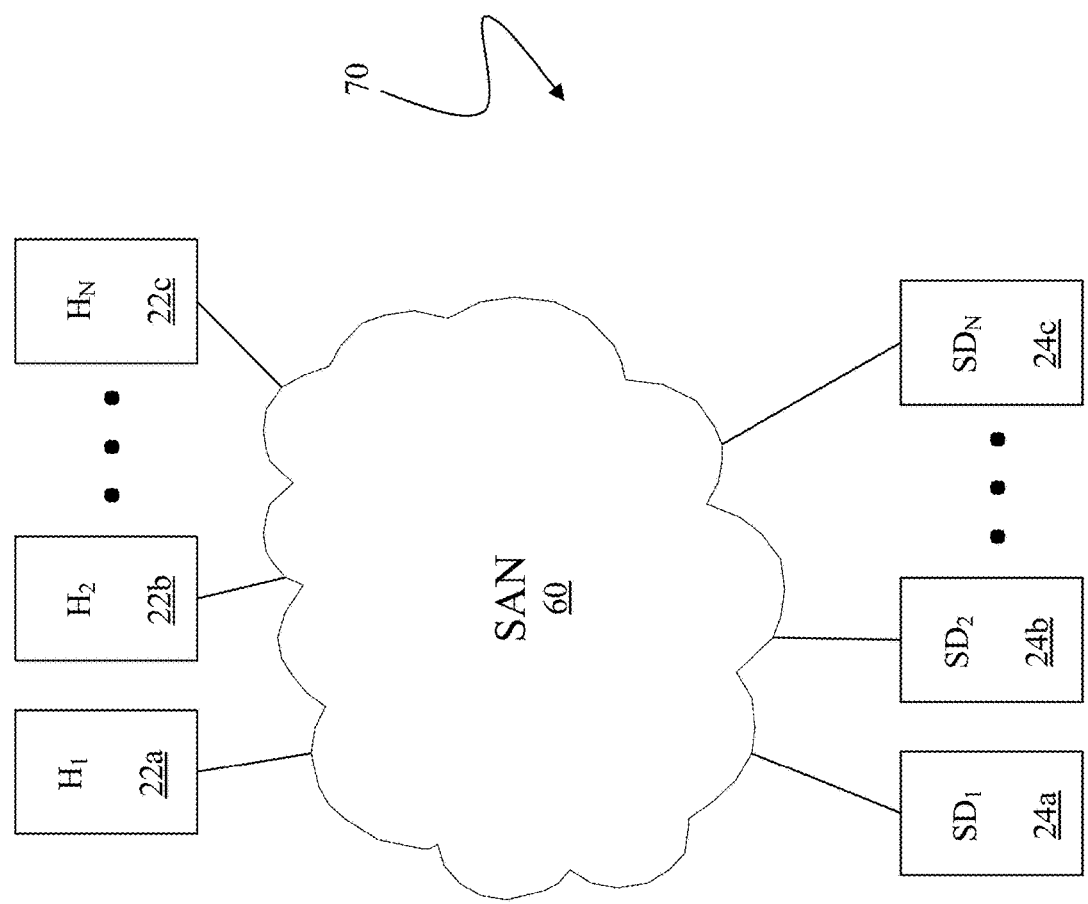
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage systems, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from Dell EMC.

Figure 4:
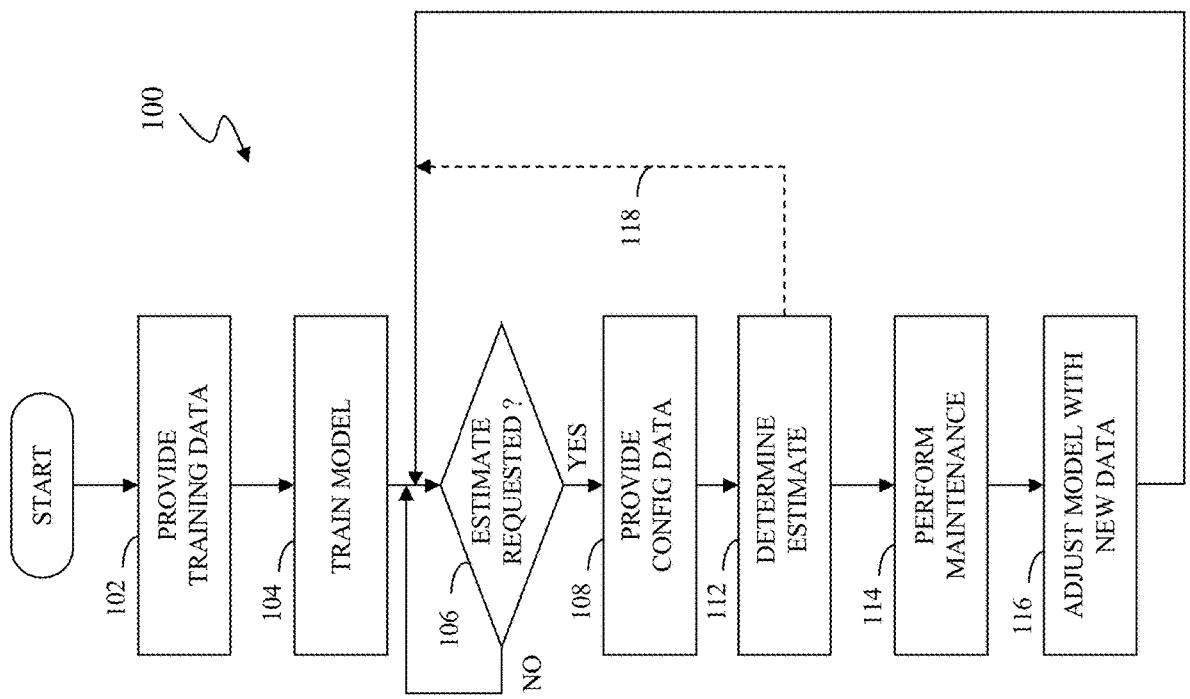
FIG. 4 is a flow diagram illustrating processing performed in connection with constructing and using a model that estimates maintenance time and materials using a neural network.

Referring to FIG. 4, a flow diagram 100 illustrates processing performed in connection with constructing and using a model that estimates maintenance time and materials for storage systems using a neural network that has been trained with empirical data from prior maintenance operations. Processing begins at a first step 102 where hardware and software configuration information from prior maintenance operations as well as maintenance parameters from the prior maintenance operations (e.g., actual time and materials for the prior maintenance e operations) is provided to the model. The hardware and software configuration information may include any parameters that may be potentially relevant and may potentially impact the time and materials needed for maintenance operations, including local and global memory amounts, current usage of the storage system, internal communication loads, existing I/O loads, physical components of the storage system and interconnections thereof, etc. Note that, prior to constructing/training a model, it may not be possible to determine, with certainty, which configuration parameters or combinations of parameters affect maintenance time and materials for a particular maintenance operation. However, it is possible for engineers and maintenance personal that are familiar with storage system maintenance operations to choose configuration parameters that are expected to be significant. Moreover, the neural network and the model constructing mechanism are expected to effectively determine an amount of impact (weights) for configuration parameters and combinations thereof, as explained in more detail elsewhere herein.

Following the step 102 is a step 104 where the information/data provided at the step 102 is used to create a model that may be used to estimate maintenance time and materials for prospective maintenance operations. In an embodiment herein, the model is constructed using a Self-Organizing Map (SOM) algorithm—which is a type of neural network that is capable of discovering hidden non-linear structure in high dimensional data. For the SOM neural network used herein, the weights of the neurons are initialized to small random values as a first step to constructing the model. In other embodiments, the weights may be initialized based on expected final values for the weights as a way to have the SOM model converge in less iterations. After initializing the weights, the model may be provided with the information/data from the step 102, which uses each set of data to first determine a Euclidean distance to all weight vectors. A neuron having a weight vector that is most similar to the input is deemed to be the best matching unit (BMU). The weights of the BMU and neurons close to the BMU in the SOM grid are adjusted towards the input vector. The magnitude of the change decreases with time and with the grid-distance from the BMU. This may be repeated for all of the sets of input data and/or until the SOM model converges. Note that other types of machine learning unsupervised models may be used instead of the SOM model illustrated herein.

The SOM algorithm and training of SOM networks is generally known in the art. The system described herein uses the different input variables (dimensions) associated with different maintenance operations along with known associated resulting time and materials maintenance values to train the SOM model used for predicting future maintenance time and materials. In an embodiment herein, a separate model is constructed for each type of possible maintenance operation that may be performed on a storage system. For example, a particular model may correspond to an online engine add maintenance procedure (i.e., adding a physical storage unit like the physical storage units 33a-33c, discussed above) in which the storage system is up and running while more storage capacity is added to the storage system. To train a SOM model, training data is constructed by identifying a set of "features/dimensions" which may include storage system I/O load, memory size, drive count, etc. of the storage system, the size and parameters of the hardware being added (e.g., physical storage unit capacity, CPU count, memory size etc.), and the actual time and materials needed for the online engine add maintenance operation. After training with several examples of different maintenance procedures, the model is ready to estimate time and materials for a prospective maintenance operation in response to being provided appropriate input parameters. Following the step 104 is a test step 106 where the system essentially polls to wait for a user to request an estimate of a maintenance operation. After the model is constructed at the steps 102, 104, the system waits for a request for an estimate. If it is determined at the test step 106 that an estimate has been requested, control passes from the test step 106 to a step 108 where data is provided for the estimate. The data includes some of the dimensions that were input for training and the model output is a prediction of time and material estimate. Following the step 108 is a step 112 where the model estimates the time and materials for the maintenance operation based on the inputs provided at the step 108. In an embodiment herein, the time and materials estimate provided at the step 112 may be broken down into different phases of the maintenance operation such as setup time, time for a first phase, time for a second phase, etc. For example, for an online engine add maintenance operation, the result from the step 112 may provide separate times for estimated setup time, a first amount of estimated time to add the engine (physical storage unit), hook at cables and bring the new engine online, a second amount of estimated time to redistribute global memory of the storage system to include the new engine memory portion, a third amount of estimated time to re-distribute disk data of the storage system to include the new disks in the new engine, and an estimated clean up time. Note that providing separate estimates for different phases of a maintenance operation allows providing higher service level objectives for some phases and lower service level objectives for other phases.

Following the step 112 is a step 114 where the maintenance operation is performed. Following the step 114 is a step 116 where the actual maintenance operation time and the materials used for the maintenance operation, along with all of the other parameters (e.g., the parameters provided at the step 108), are processed as an additional set of training data to the model. In an embodiment herein, after the model is created at the step 104, additional training data may be provided to improve the performance of the model. Processing additional training data at the step 116 is similar to the processing at the step 104, described above. Following the step 116, control transfers back to the step 106, described above, to wait for a next request for an estimate. In some embodiments, data from actual maintenance operations is not used to improve/train the model. This is represented by an alternative path 118, which shows that after the model generates an estimate at the step 112, control transfers back to the step 106 to wait for a next request for another estimate. Note that the processing illustrated by the flow diagram 100 could be performed either by a storage system (like the storage system 24 or the storage system 26) or could be performed by a separate computing device, such as a laptop or desktop computer or even a smartphone or a tablet.

Figure 5:
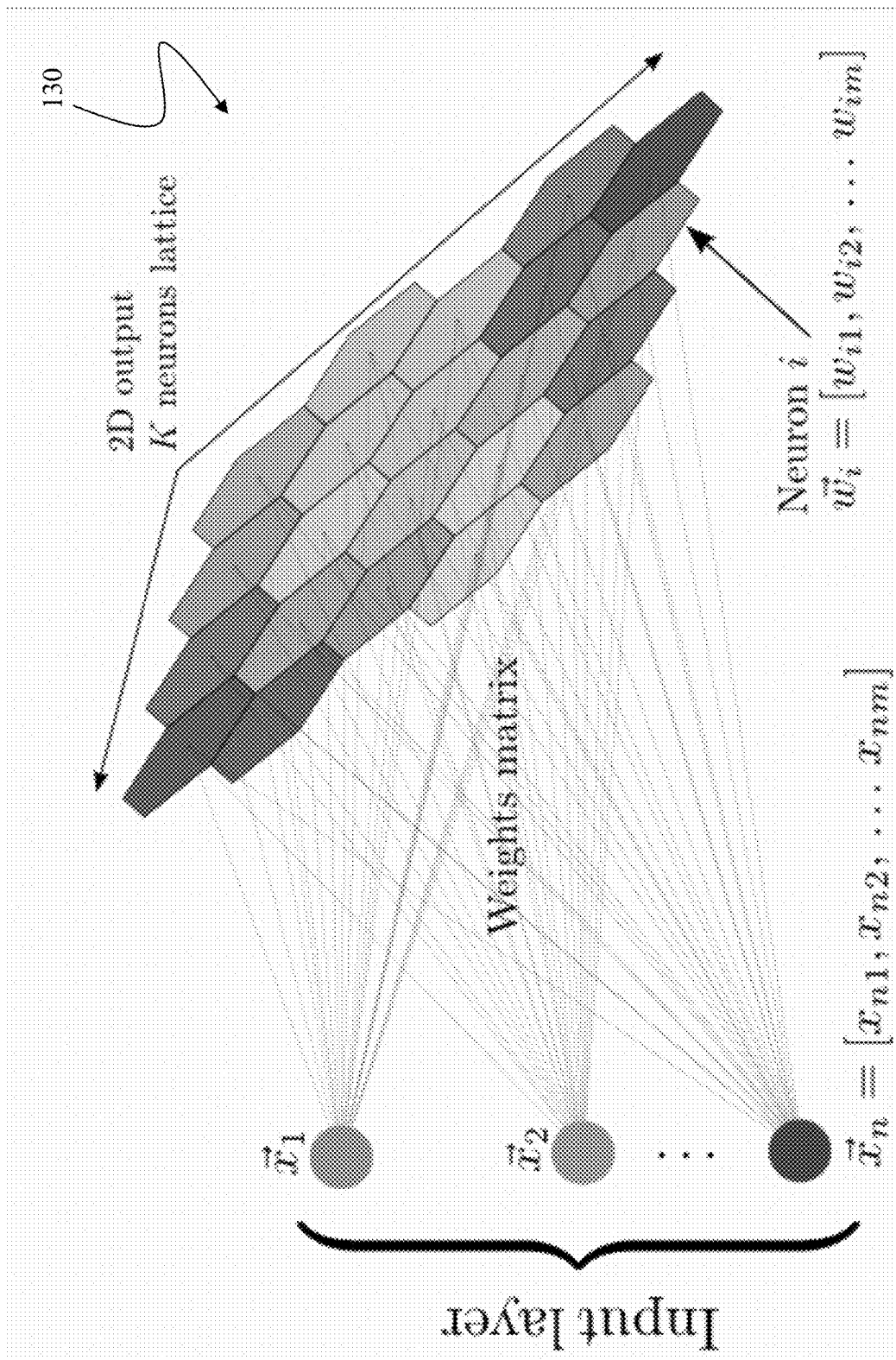
FIG. 5 is a schematic illustration showing a self-organized map using in connection with an embodiment of the system described herein.

Referring to FIG. 5, a diagram 130 illustrates in more detail a self-organized map (SOM) neural network. Construction and use of a SOM is known in the art. A SOM is a discrete, planar grid of neurons having a hidden layer and fed by an input layer. Each hidden layer neuron has several neighbor neurons. A distance between each neuron and its neighbors is a Euclidean distance between the input-to-hidden layer weights of each neuron. The distance encodes low-dimensional information about the original data. Each hidden layer neuron in the diagram 130 has a weight vector with n components; the input is densely connected to the hidden layer.

Baseline training data is fed to SOM model. As mentioned above, each component of the training data is deemed a dimension, so that sample data $x_i$ is a sample vector of m dimensions $x_i = d_1, d_2, d_3, \ldots, d_m$. The SOM model reduces the m input dimensions to a lesser number of output dimensions (e.g., one or two dimensions). Thus, for example, even though there may be m input dimensions for the maintenance operation of replacing an online engine, the result of the SOM is just the estimated maintenance time and estimated cost for materials. It is known in the art that SOM neural networks by nature are effective in finding relationships between input data (configuration parameters, in the system described herein) and using the input data to predict (or classify) new data (maintenance operation estimates, in the system described herein). It is possible to extract more complex patterns by feeding more input dimensions to the SOM model. For instance, in the system described herein where maintenance operation estimates are provided as output, the additional inputs could include additional customer environment information and known I/O performance profile. The SOM model tries to fit the input data and predict the amount of time and materials (parts) needed for maintenance procedures. The SOM model uses an unsupervised iterative training procedure to analyze large amounts of data. In the system described herein, the SOM model is used to cluster various daily maintenance procedures from several customers and several data sets into a manageable number of groupings. The SOM model produces an organized, low-dimensional array of patterns that represent a range of conditions found in the input data.

Various embodiments discussed herein may be combined with each other in appropriate combinations in connection with the system described herein. Additionally, in some instances, the order of steps in the flow diagrams, flowcharts and/or described flow processing may be modified, where appropriate. Furthermore, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing maintenance to a storage system, comprising:
    initializing weights of neurons of a plurality of self-organized map neural network models that output time and materials estimates based on input configuration data, wherein a separate model is constructed for each type of maintenance operation that may be performed on the storage system;
    providing training data that is used to adjust the weights of each of neurons of each of the self-organized map neural network models;
    providing configuration data of the storage system to the one of the self-organized map neural network models corresponding to the type of maintenance operation being performed;
    obtaining an estimate of maintenance time and materials needed for the maintenance operation based on the configuration data provided to the one of the models corresponding to the type of maintenance operation being performed;
    performing the maintenance; and
    providing actual maintenance parameters resulting from performing the maintenance as additional training data for the one of the models corresponding to the type of maintenance operation being performed.

2. A method, according to claim 1, wherein weights of neurons of the self-organized map are initialized randomly.

3. A method, according to claim 1, wherein the training data includes at least one of: an I/O load of the storage system, memory size of the storage system, a drive count of the storage system, and size and parameter information corresponding to hardware being added for the maintenance operation.

4. A method, according to claim 3, wherein the size and parameter information corresponding to hardware being added includes at least one of: physical storage unit capacity of the hardware, a CPU count of the hardware, and a memory size of the hardware.

5. A method, according to claim 1, wherein the training data includes actual time and materials for prior storage system maintenance operations used for the training data.

6. A method, according to claim 1, wherein the estimate of maintenance time and materials is broken into separate phases.

7. A method, according to claim 1, wherein the model is provided on the storage system.

8. A method, according to claim 1, wherein at least one of the models corresponds to an online engine add maintenance procedure in which the storage system is running while more storage capacity is added to the storage system.

9. A non-transitory computer readable medium containing software that facilitates providing maintenance to a storage system, the software comprising:
    executable code that initializes weights of neurons of a plurality of self-organized map neural network models that output time and materials estimates based on input configuration data, wherein a separate model is constructed for each type of maintenance operation that may be performed on the storage system and wherein training data that is used to adjust the weights of each of neurons of each of the self-organized map neural network models;
    executable code that provides configuration data of the storage system to the one of the self-organized map neural network models corresponding to the type of maintenance operation being performed;
    executable code that obtains an estimate of maintenance time and materials needed for the maintenance operation based on the configuration data provided to the one of the self-organized map neural network models corresponding to the type of maintenance operation being performed; and
    executable code that provides actual maintenance parameters resulting from performing the maintenance as additional training data for the one of the models corresponding to the type of maintenance operation being performed.

10. A non-transitory computer readable medium, according to claim 9, wherein weights of neurons of the self-organized map are initialized randomly.

11. A non-transitory computer readable medium, according to claim 9, wherein the training data includes at least one of: an I/O load of the storage system, memory size of the storage system, a drive count of the storage system, and size and parameter information corresponding to hardware being added for the maintenance operation.

12. A non-transitory computer readable medium, according to claim 11, wherein the size and parameter information corresponding to hardware being added includes at least one of: physical storage unit capacity of the hardware, a CPU count of the hardware, and a memory size of the hardware.

13. A non-transitory computer readable medium, according to claim 9, wherein the training data includes actual time and materials for prior storage system maintenance operations used for the training data.

14. A non-transitory computer readable medium, according to claim 9, wherein the estimate of maintenance time and materials is broken into separate phases.

15. A non-transitory computer readable medium, according to claim 9, wherein the software is provided on the storage system.

16. A non-transitory computer readable medium, according to claim 9, wherein at least one of the models corresponds to an online engine add maintenance procedure in which the storage system is running while more storage capacity is added to the storage system.

\* \* \* \* \*